United States Patent
Domján et al.

(10) Patent No.: US 7,430,294 B2
(45) Date of Patent: Sep. 30, 2008

(54) METHOD AND APPARATUS FOR THE ENCRYPTION OF DATA

(75) Inventors: László Domján, Budapest (HU); Gábor Erdei, Budapest (HU); Pál Koppa, Budaörs (HU); Gábor Szarvas, Budapest (HU); Tamás Újvári, Pécs (HU); Peter Toth, Asarum (SE)

(73) Assignee: Bayer Innovation GmbH, Dusseldorf (DE)

( * ) Notice: Subject to any disclaimer, the term of this patent is extended or adjusted under 35 U.S.C. 154(b) by 842 days.

(21) Appl. No.: 10/492,232

(22) PCT Filed: Oct. 9, 2002

(86) PCT No.: PCT/HU02/00104

§ 371 (c)(1),
(2), (4) Date: Apr. 8, 2004

(87) PCT Pub. No.: WO03/032300

PCT Pub. Date: Apr. 17, 2003

(65) Prior Publication Data

US 2004/0252832 A1 Dec. 16, 2004

(30) Foreign Application Priority Data

Oct. 9, 2001 (HU) .................................. 0104183

(51) Int. Cl.
*H04N 7/167* (2006.01)
(52) U.S. Cl. ...................... 380/201; 380/44; 369/103; 369/109
(58) Field of Classification Search .............. 380/201, 380/33
See application file for complete search history.

(56) References Cited

U.S. PATENT DOCUMENTS

| 5,526,338 | A | | 6/1996 | Hasman et al. |
| 5,841,861 | A | * | 11/1998 | Kondo et al. .................. 705/57 |
| 5,917,798 | A | | 6/1999 | Horimai et al. |

(Continued)

FOREIGN PATENT DOCUMENTS

EP 0 751 517 A2 6/1996

(Continued)

*Primary Examiner*—Nasser Moazzami
*Assistant Examiner*—Fikremariam Yalew
(74) *Attorney, Agent, or Firm*—Norris McLaughlin & Marcus PA

(57) ABSTRACT

There is disclosed a method and apparatus for coding data, for the purpose of preventing unauthorised readout of information. In the method, user information is converted into digital data (UD), and the digital data is recorded in a first data set (CD) and a second data set (HD), where the first data set (CD) is recorded in a first optical storage medium of a data carrier, and the second data set (HD), is recorded in a second, holographic storage medium of the data carrier. According to the method, the digital data (UD) is divided between the first and second data sets (CD,HD) in a manner so that a part of the user information is contained only in the first data set (CD), and another part of the user information is contained only in the second data set (HD), and the relative proportion of the user information in the data sets is selected so that the information contained in any one of the data sets is insufficient by itself to restore the complete user information (UD) contained in both data sets.

29 Claims, 9 Drawing Sheets

U.S. PATENT DOCUMENTS

Figure 1:
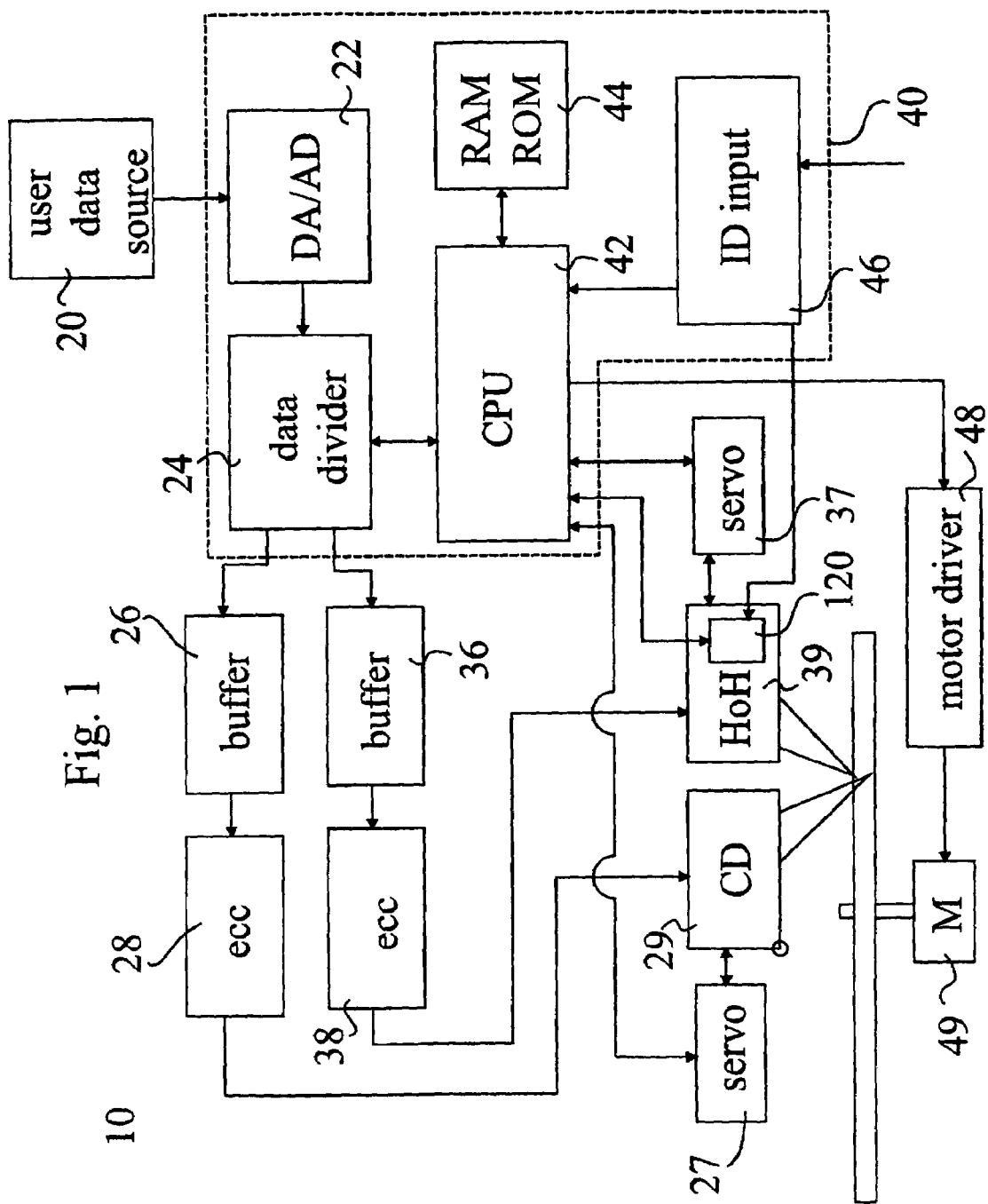

2003/0025955 A1* 2/2003 Curtis .................... 359/35
2005/0066181 A1* 3/2005 Burns .................... 713/187

FOREIGN PATENT DOCUMENTS

| EP | 0 890 948 A1 | 7/1998 |
| EP | 1 065 658 A1 | 2/1999 |
| JP | 11066610 | 3/1999 |
| WO | WO 01/2065 A1 | 3/2001 |
| WO | WO0157863 | 8/2001 |
| WO | WO02/11081 | 2/2002 |

* cited by examiner

METHOD AND APPARATUS FOR THE ENCRYPTION OF DATA

The invention relates to a general holographic data security system, by which digital data, stored on a traditional type of optical storage medium, such as CD or DVD, can be protected against unauthorized reading and copying.

Several types of digital data (music, video, digital cinema, software) require protection against unauthorized reading and copying. The distribution of digital data on the currently applied mediums (CD, DVD, Floppy, etc.) combined with mathematical data encryption do not protect against unauthorised copying. The cracking of mathematically encrypted data is a question of hardware costs. Further, it may not be very feasible to encrypt data which is typically processed in real time (such as digital music, which is read from a CD disk). For the legitimate user of such digital data, the data reading device must be equipped with appropriate decryption processor systems. A continuous decrypting algorithm can not be very secure, because there is not sufficient time to decrypt the data. Further, the issuance and access to the decryption key always adds considerable inconvenience when the legitimate user wishes to retrieve the data. This added inconvenience can not always. be tolerated by the customers, particulary when the data is not particularly "secret" for the customer, but only for the producer of the data, such as an audio CD disk. Therefore, potential customers are likely to reject any digital data protection systems which would require the added interaction of the user, such as the input of a personal acess code or any similar action.

It has been proposed, combine traditional optical storage means with holograms. The documents WO01/57863 and WO01/20605 disclose various methods, with which a static hologram may be formed on a CD-type optical data carrier. The presence of the visible hologram could indicate to the user that the purchased CD is not a pirated copy, but an authentic, original product. However, this would not prevent the illegal copying of the contents of the CD with a readily available CD-writing equipment.

The document WO02/11081 proposes the use of a CD-type or hologram-type optical recording medium in combination with a chip on the optical recording medium. Encrpyted user data is stored in the optical recording medium. The chip contains a decryption key, which is used to decode the contents of the optical recording medium. The decoding itself may take place exclusively in the chip, or also outside the chip. In any case, at least two hardware data interfaces are needed for the reading of the data. One data interface ensures the communication with the chip, while the other data interface reads fromt the optical recording medium. A similar approach is disclosed by Akkermans et al. in the Technical Digest of the "Joint International Symposium on Optical Memory and Optical Data Storage", held at Waikola, Hawaii 7-11 Jul. 2002, see pp 3-5. There, a chip is embedded in a (CD disk, with encryption keys and optionally an encryption algorithm. The chip communicates with the readout apparatus via an RF channel. However, the chip may only have a limited capacity, which may be sufficient only to record the identification of the digital rights. The decoding still must take place outside the chip, and therefore the key may be intercepted by hackers.

U.S. Pat. No. 5,917,798 to Horimai et al, and the document EP 1065 658 A1 disclose an optical disk with two data storage layers. One storage layer is a holographic storage layer, and the other storage layer is a traditional CD or DVD type storage layer. In this system it is foreseen to store the user data essentially completely in the holographic storage layer, while the CD-type layer would physically store the directory and track information. Both layers are read by a common, combined optical head, which is capable of reading data from both holographic and CD-type optical layers. EP 1 065 658 A1 discloses the possibility to store certain information, such as the directory and track information on the other layer as the layer storing the actual content of the user information, for the purpose of preventing the copying of the user information. However, this known system foresees to store the actual information content of the user information in the holographic layer, and does not mention the possibility to expressly divide the user information between the two storage layers. Accordingly, this known system presumes the use of a large-capacity (hence complicated and expensive) holographic recording system.

The object of this invention is to provide a method which prevents the unauthorised readout of data from CD or DVD type optical recording media, to provide a novel type of data carrier and apparatus which supports the copy prevention method of the invention, and where the apparatus is compatible with traditional CD or DVD-type recording media.

According to the method, user information is converted into digital data, and the digital data is recorded in a first data set and a second data set, where the first data set is recorded in a first optical storage medium of a data carrier, and the second data set is recorded in a second, holographic storage medium of the data carrier. The unauthorised readout of information is prevented as a result of the following steps:

the digital data is divided between the first and second data sets in a mariner so that a part of the user information is contained only in the first data set, and another part of the user information is contained only in the second data set, and the relative proportion of the user information in the data sets is selected so that the information contained in any one of the data sets is insufficient by itself to restore the complete user information contained in both data sets. With other words, the user data is divided into the two data sets so that the complete user information content of the digital data may be reconstructed only if the contents of both data sets are combined.

In this manner, readout of the data impossible if only one data set is accessible for an unauthorised user. On the other hand, the reconstruction of the complete user data is easily realised if both data sets are accessible, because the combination or reconstruction of the complete user data need no particular decoding or decrypting algorithms. Such decryption may be difficult to realise with data which is normally retrieved continuously, such as with audio or video information from a CD or DVD disk. The decryption can not work with very complicated encryption keys (due to the continuous reconstruction requirement), and therefore may be cracked relatively easily, or if the encryption keys are complicated, then the reconstruction of data may demand very high processing power from the replay electronics.

In a possible embodiment, the holographic layer carries extensive decryption key for the underlying digital data. Alternatively, the holographic layer may carry some random parts of the user data, while the majority is to be stored in the first data set recorded in a traditional manner.

For the realisation of the method, the invention proposes a holographic data storage device that can store data either without encryption or coding, or one which may store physically encrypted data using a phase-encoded holographic data storage technology. The holographic encryption disables reading and copying the data, stored on the holographic medium, for persons who do not know the encryption key. By mixing the holographic recording technology with any other type of digital optical storage technology (e.g. CD, DVD, etc.), the digital data can be protected against copying and reading by unauthorised persons.

More specifically, the apparatus of the invention comprises a first optical reading and/or recording channel for reading and/or recording of data from/to a first optical data storage medium, and a second reading and/or recording channel for reading and/or recording of data from/to a holographic storage medium. The apparatus also comprises control means for controlling the operation of the first reading and/or recording channel and second reading and/or recording channel. According to the invention, the control means is adapted for dividing the user data from a user data source into the first and second reading and/or recording channels in a manner so that a part of the user information is contained only in a first data set, which is recorded in the first optical storage medium through the first reading and/or recording channel. The other part of the user information is contained only in a second data set, which is recorded in the second, holographic optical storage medium through the second reading and/or recording channel. The relative proportion of the user information in the data sets is selected so that the information contained in any one of the data sets is insufficient by itself to restore the complete user information contained in both data sets.

The apparatus of the invention is also capable of extracting divided user data parts from the first and second reading and/or recording channels and reconstructing the extracted user data parts, and feeding the reconstructed user data into a data output, by performing the steps of reading the first data set from the first storage medium, and substantially simultaneously reading the second data set from the holographic storage medium. The apparatus is capable of reconstructing the user data substantially continuously in real-time during readout.

The readout apparatus could contain two different reading heads within the device, one reading the digital data and another one reading the hologram. However, it is possible to integrate both heads in one optical unit. As the sweep areas of reading could be quite different for the two heads, the track pitch of the holograms may be much larger then that of the digital bits. Thus the two heads can either be placed on different actuators or placed on the same actuator and the holographic head would read again and again after a certain number of digital tracks has been passed. Synchronising between the digital and holographic layers could be realised by an application oriented IC. This realisation can be built from the elements of the existing CD-DVD technology and an appropriately adapted holographic technology.

Alternatively, a physical coupling may be established between the holographic layer and the digital layer. In this embodiment the hologram itself would act as a phase distortion means on the reading beam of the digital layer. The reading beam distorted by the hologram can not be focused to a spot size comparable to the bit size on the digital layer until the correct phase coded reference beam is fed to the hologram. This embodiment would involve a complex holographic-digital head, where the holographic output beam is reading the digital data. A combination of the above data coupling techniques can also be applied.

The invention can use the advantageous feature of the holographic security layer, which is capable of auto-destruction after a certain number of reading attempts. As this feature is simply realised by the selection of the appropriate holographic storage material, no software or special electronics is needed, and the chances to disable the auto-destruct function are minimal or practically non-existent.

Figure 2:
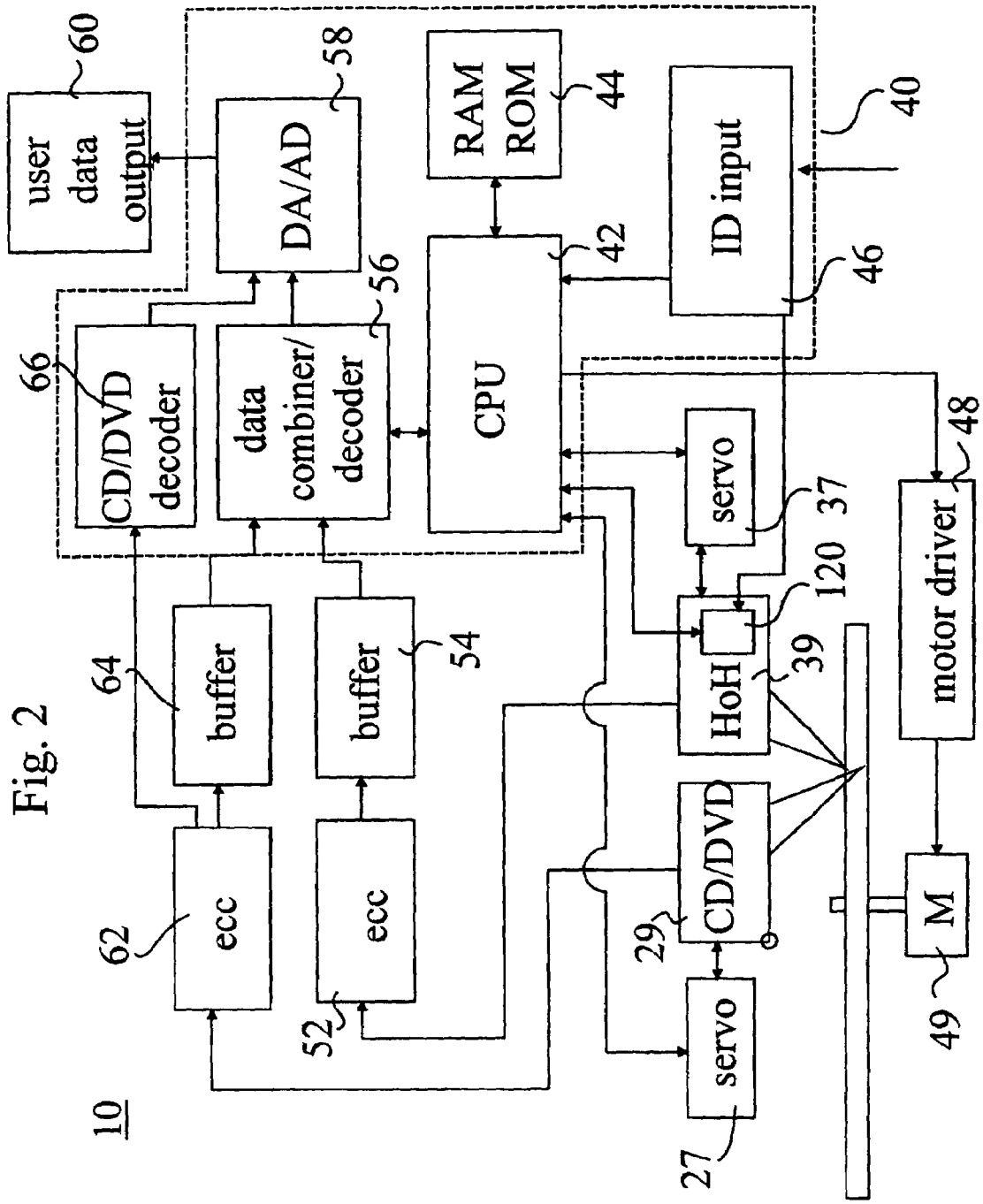
Figure 3:
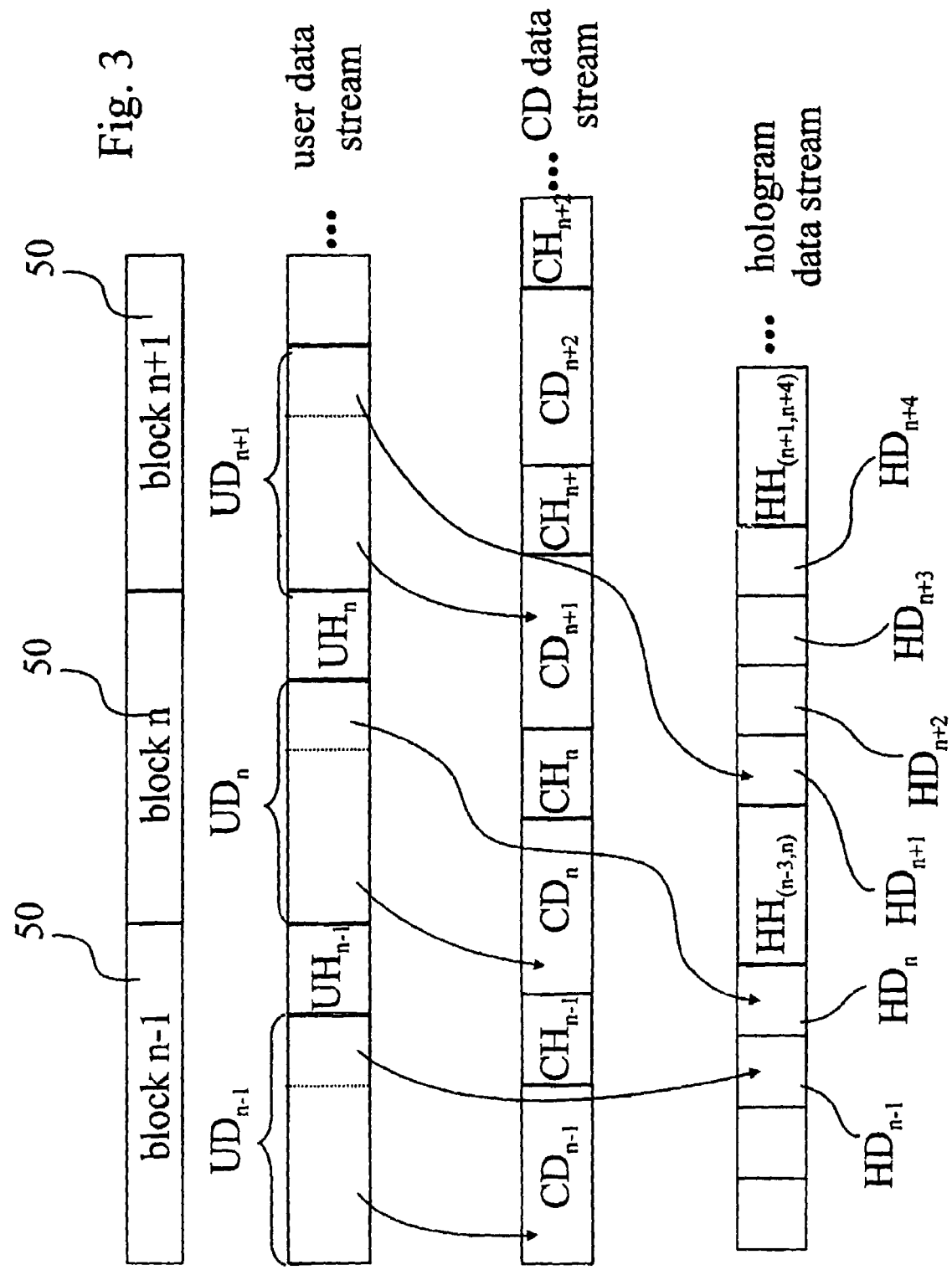
Figure 4:
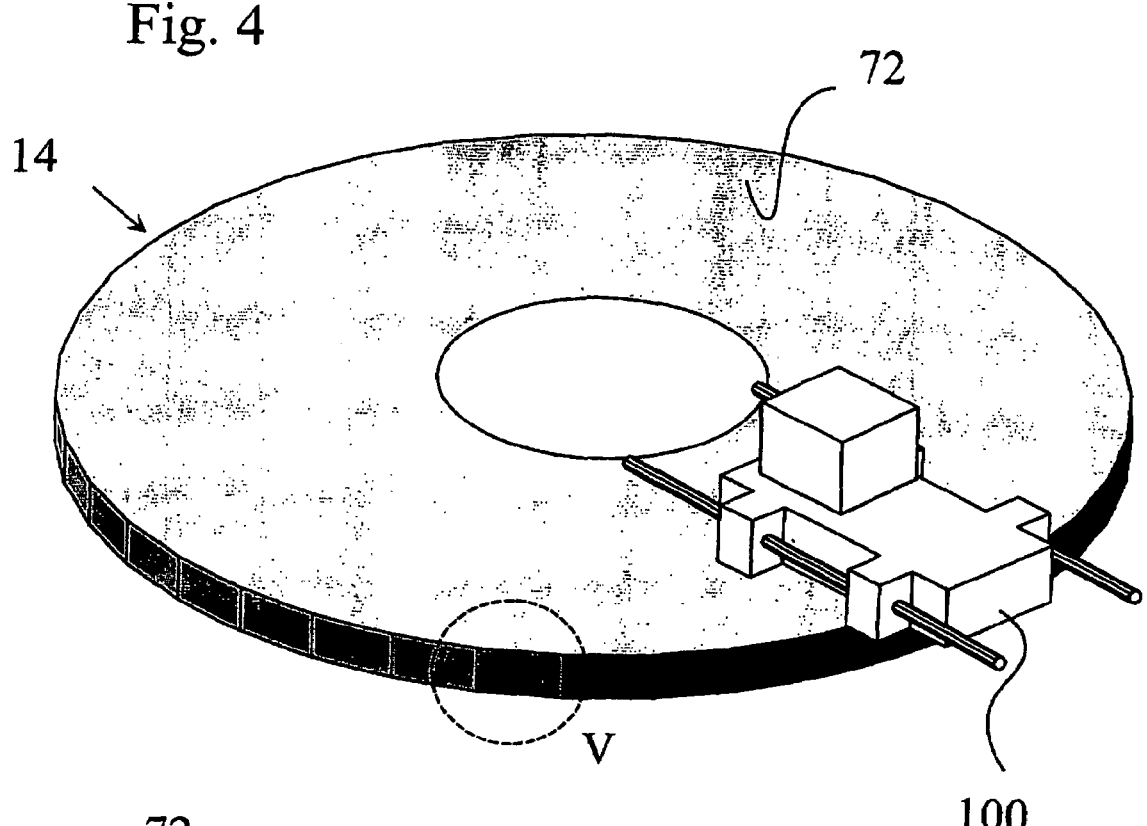
Figure 5:
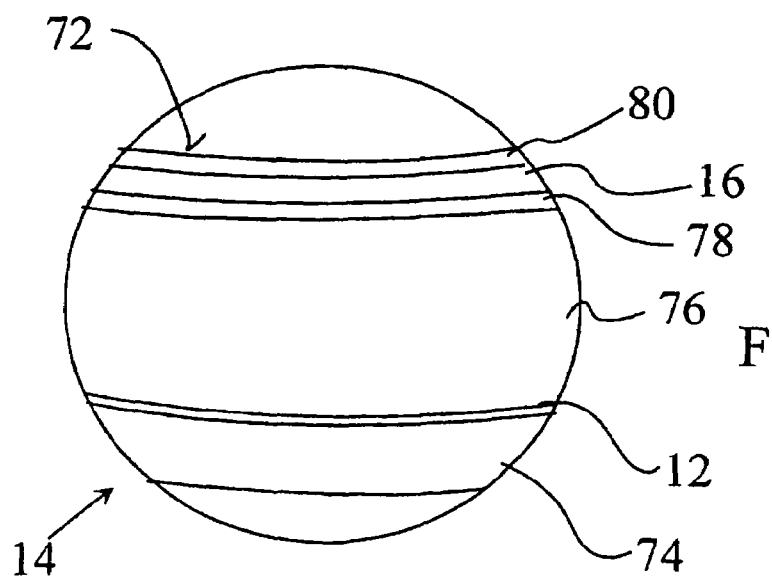
Figure 6:
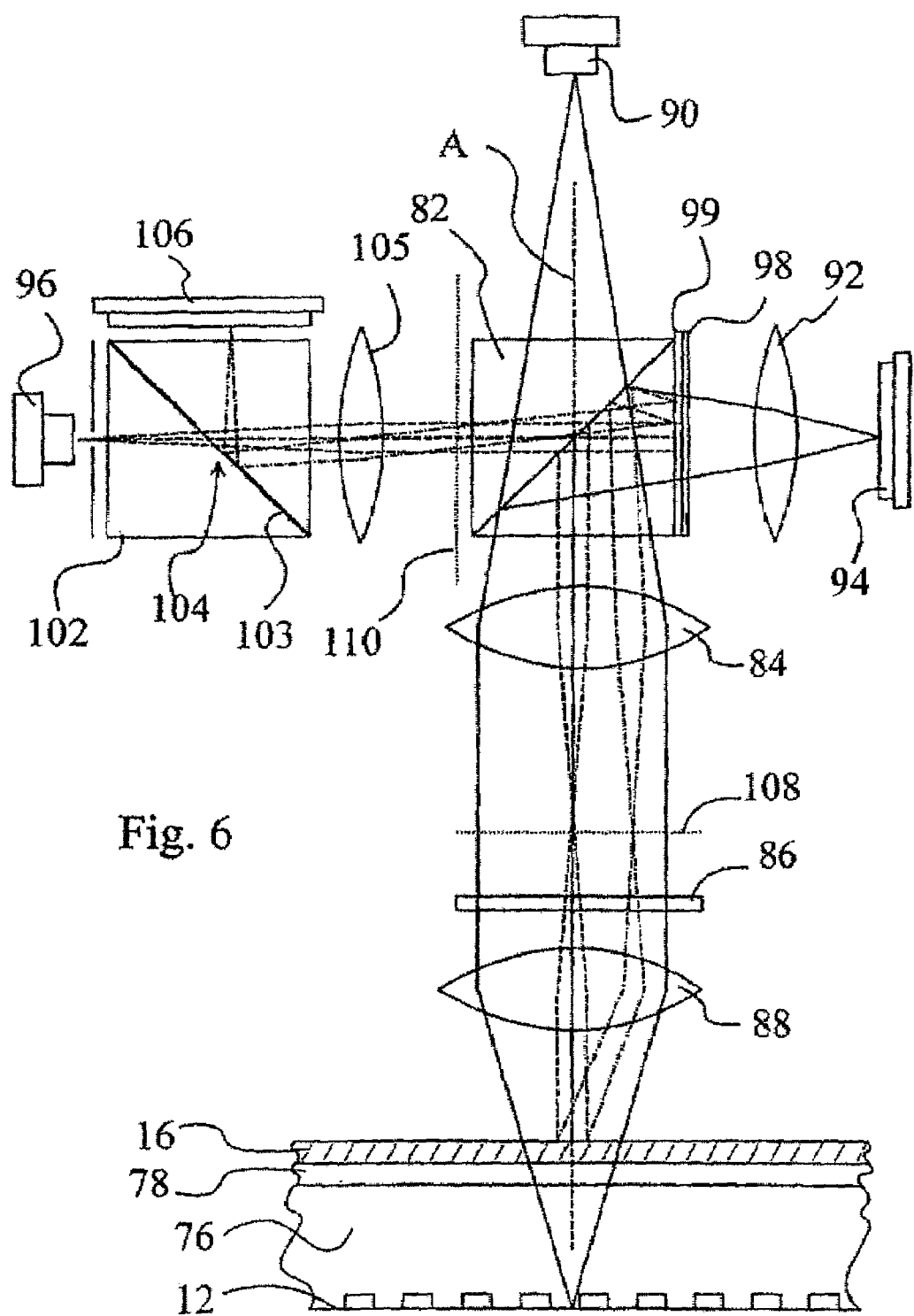
Figure 7:
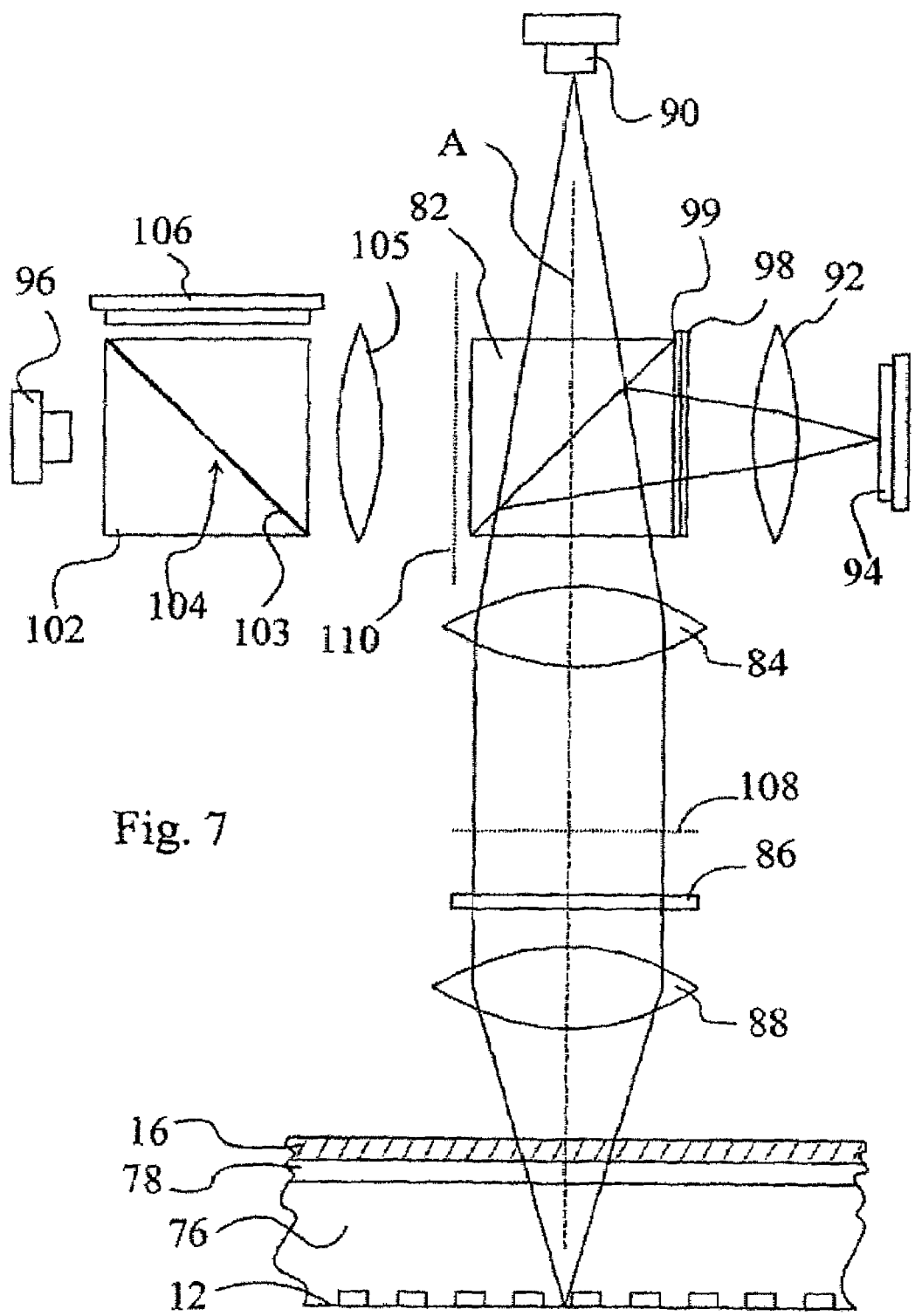
Figure 8:
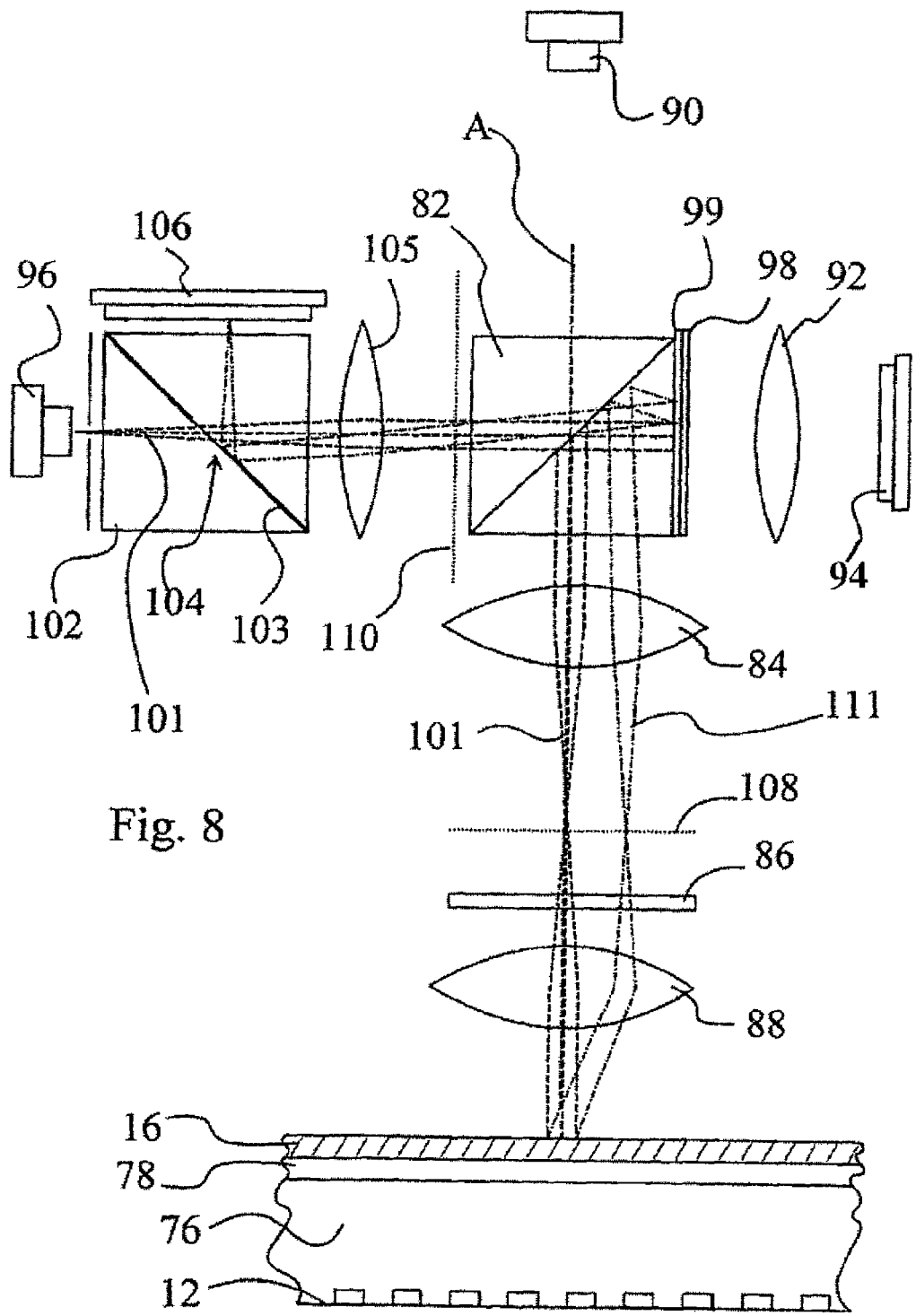
Figure 9:
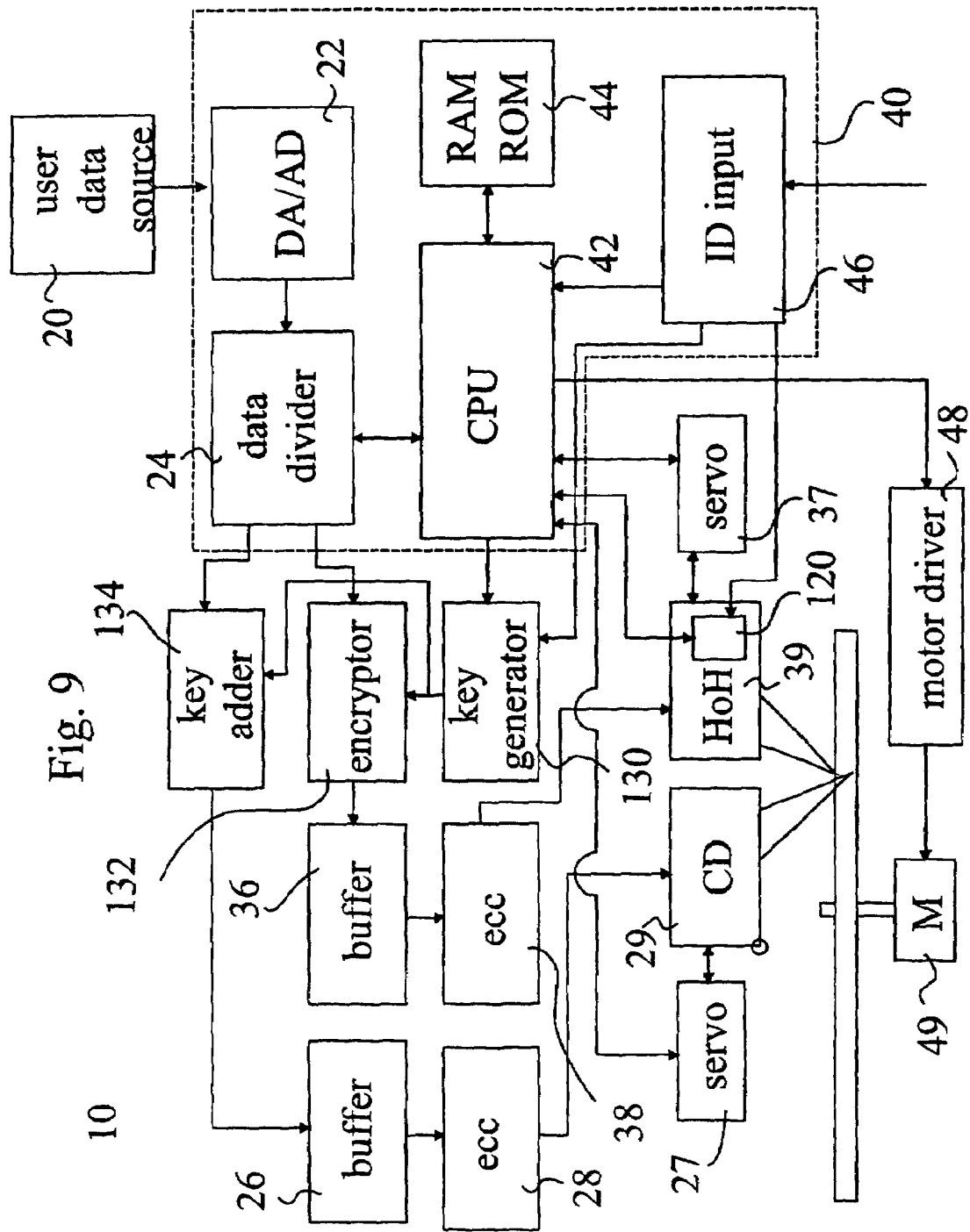
Figure 10:
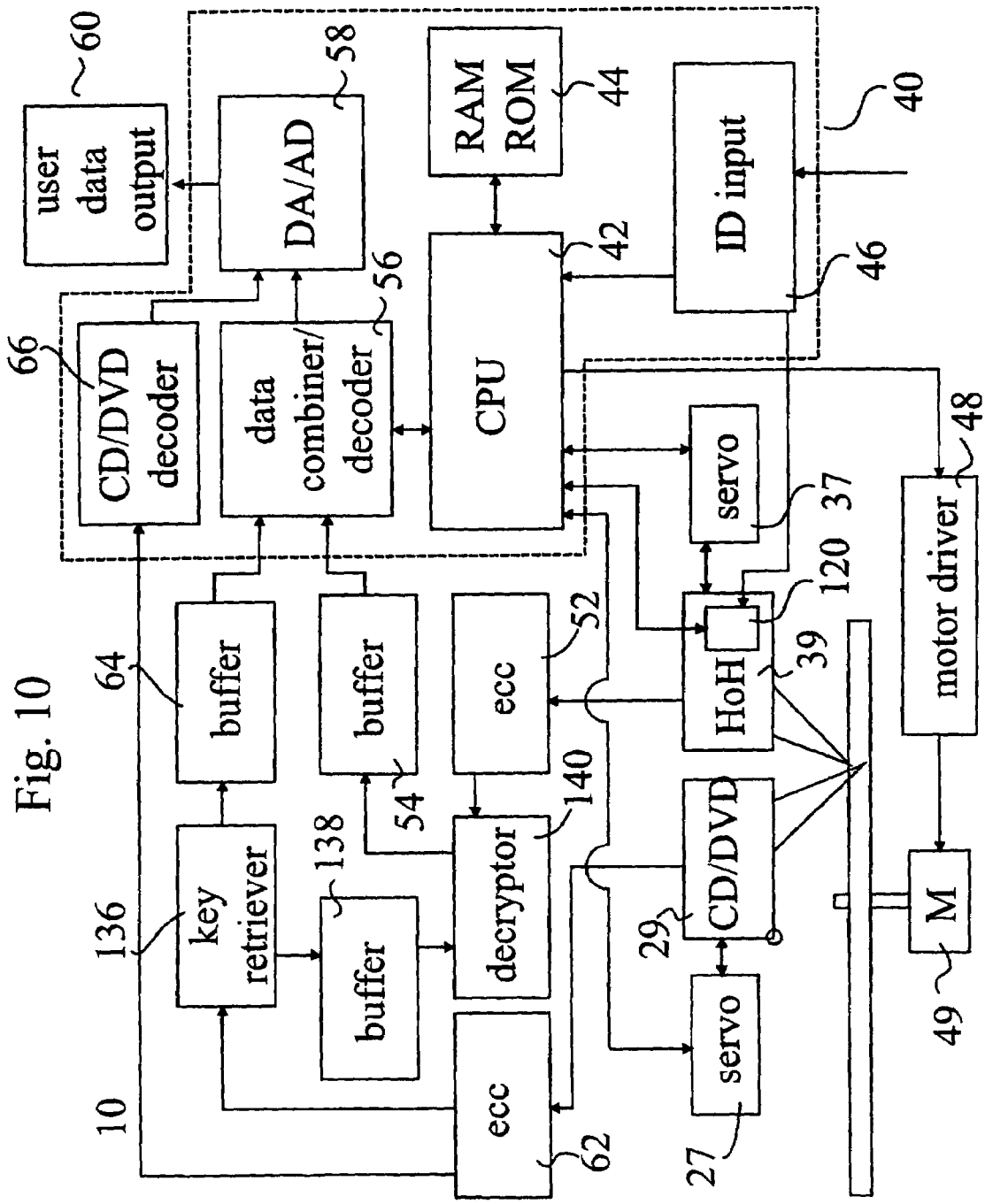

The invention will be now described more in detail with reference to the attached drawings, in which FIG. 1 is a block diagram of an apparatus for recording of user data according to the invention, FIG. 2 is a block diagram of an apparatus for reading of user data according to the invention, FIG. 3 is a schematic drawing illustrating the principle of the data division between the optical and holographic storage layers, FIG. 4 is a schematic perspective view of a data carrier of the invention and an associated readout head, FIG. 5 is an enlarged cross section of the data carrier of FIG. 4, corresponding to the detail marked with V, FIG. 6 is a schematic drawing of an optical head used in a simpler version of the readout apparatus of FIG. 2, FIG. 7 is a partial drawing similar to FIG. 7, containing only one optical path associated to one reading channel of the apparatus of FIG. 2, FIG. 8 is a complementing partial drawing similar to FIG. 7, containing only the other optical path associated to the other reading channel of the apparatus of FIG. 2, FIG. 9 is a block diagram of a modified embodiment of the apparatus shown in FIG. 1, and FIG. 10 is a block diagram of a modified embodiment of the apparatus shown in FIG. 2, adapted for reading of data recorded with the apparatus of FIG. 9.

FIGS. 1 and 2 illustrate the functional building blocks of a reading and/or recording apparatus 10 which may read or record user data from a user data source 20. Though in FIGS. 1 and 2 appear to show two different embodiments, namely a reading and a recording apparatus separately, it is understood that in fact a single apparatus may include both embodiments shown in FIGS. 1 and 2. A number of functional units are common for both embodiments, and these common units may be used both during reading and recording.

The apparatus 10 comprises a first optical reading and/or recording channel for reading and/or recording of data from/to a first optical data storage medium, which may be the CD layer 12. The CD layer 12 may be a CD or DVD type layer in a data carrier 14, which will be explained more in detail with reference to FIG. 4. In the shown embodiments, the first optical reading and/or recording channel is a CD channel in the apparatus 10. The apparatus 10 also comprises a second reading and/or recording channel for reading and/or recording of data from/to a holographic storage medium. The holographic storage medium may be a holographic recording layer 16 in the data carrier 14. The second reading and/or recording channel is the holographic channel in the apparatus 10, which will be explained below with reference to FIGS. 1, 2, 5 and 6.

Turning now to FIG. 1, the CD channel of the apparatus 10 comprises the AD converter 22, the data divider 24, the buffer 26, and the error correcting circuit 28, and the CD head 29. The AD converter 22 may be omitted if the user data source 20 already supplies digitized information. The data divider 24 splits the data received from the user data source in two parts, as will be explained below with reference to FIG. 3. One part of the user data is recorded through the CD channel onto the CD layer 12. This part is forwarded from the data divider 24 to the buffer 26, and from the buffer 26 to the error correcting circuit 28. The buffer 26 ensures that the data is recorded onto the CD layer 12 with correct timing and positioning in relation to the data recorded through the holographic channel.

The holographic channel of the apparatus 10 also comprises the AD converter 22 and the data divider 24, so these section of the holographic channel is common with the CD channel. Thereafter, the data in the holographic channel flows from the data divider 24 through the buffer 36, the error correcting circuit 38, and the holographic head 39. As mentioned above, the data divider 24 splits the data received from the user data source in two parts, and a part of the user data is recorded through the CD channel onto the CD layer 12. The other part of the data flows through the holographic channel, as explained with reference to FIG. 3. Both error correcting circuits 28 and 38 perform an error correction coding on the data, so that the physically recorded data will tolerate some degree of physical reading or recording error. The buffer 36 also ensures that the data is recorded onto the holographic layer 16 with correct timing and positioning in relation to the data recorded through the CD channel.

The apparatus comprises control means 40 for controlling the operation of the first reading and/or recording channel and second reading and/or recording channel, i. e. the CD channel and the holographic channel. The control means 40 is adapted for dividing the user data fed into the control means 40 from the user data source 20 into the CD channel and the holographic channel.

The control means 40 comprises a CPU 42 and an associated memory 44. In some embodiments, the control means 40 also includes an ID input interface 46, the role of which will be explained below. The memory 44 comprises a software instructing the CPU 42 of control means 40 to coordinate the recording of the user data from the data source 20 onto the CD layer 12 and the holographic layer 16, according to the data division between the layers, as explained with reference to FIG. 3. During readout, the CPU 42 controls the readout and reconstruction of the data. In order to perform these tasks, the CPU 42 also controls the servo systems 27 and 37 of the CD head 29 and the holographic head 39, respectively, and further the motor driver 48 of the motor 29 rotating the data carrier 14. However, instead of the CPU 42 and the memory 44, the control means 40 may comprise a dedicated chip, in which the appropriate controlling algorithm is hardware coded.

As illustrated in FIG. 3, the user data source 20 either directly or through the AD converter 22 delivers a substantially continuous, digital user data stream to the input of the data divider 24. The data stream is normally divided into data blocks 50, each block containing the actual digital user data units UD and associated headers UH. In a known manner, the headers UH are needed for the processing of the user data units UD. FIG. 3 illustrates only three data blocks 50 indexed as n−1,n,n+1 from a substantially continuous data stream, but it is understood that these data blocks 50 are preceded and followed in time by further data blocks 50.

The data divider 24 divides contents of the user data units UD of the data blocks 50 in a first data stream—marked as the CD data stream in FIG. 3— and a second data stream, which latter marked as the hologram data stream in FIG. 3. The CD data stream contains the CD data units CD and the CD headers CH, indexed corresponding to the user data UD. As may be perceived from FIG. 3, each CD data unit corresponds to a part of a user data unit UD. The remaining parts of a user data unit UD are directed by the data divider 24 towards the holographic channel, and they are merged into the holographic data units HD. The data divider 24 also provides the CD data stream and the holographic data stream with suitable data headers CH and HH. The CD data stream is recorded on the CD layer in the CD layer 12 of the data carrier 14, while the holographic data stream is recorded in the holographic layer 16 of the data carrier 14.

As shown above, the data divider 24 divides the digital data between the CD data stream and the holographic data stream in a manner so that a part of the user data units UD from each data block 50 is contained only in the CD data stream, and the remaining part of the user data units UD is contained only in the holographic data stream.

The relative proportion of the information content of the user data units UD in the CD data stream and the holographic data stream sets is selected so that the information contained in any one of the data streams is insufficient by itself to restore the complete user information contained in both data streams. This means that the complete user information content of the original user data units UD may be reconstructed only if the contents of both data sets are combined.

The ratio of the data amounts stored on holographic and digital mediums should be specified by the technical parameters, such as data capacity and reading speed of the two storing mediums. The advantageous data division ratio should be between the ratio of the data capacities and the ratio of the data reading speeds of the two mediums.

For example, for a data carrier 14 which contains both holographic and CD (or DVD) storage layers the data division ratio could be 1:4. Chosing a relatively robust holographic recording technology, with only modest storage capacities, but with a reliable writing and reading SNR, the data densitiy of the holographic recording layer 16 may be one fourth of the data density of a CD or DVD disk. For example, the data densities of the holographic and DVD technologies may be 1 bit/$\mu m^2$ and 4 bit/$\mu m^2$ respectively. Accordingly, the ratio of the data capacities will be the same as the division ratio between the data streams. One possible data division is to store 2 certain bits of each byte (e.g. 3rd and 6th) on the holographic medium and the other 6 bits on the CD or DVD medium. Restoring the original data contents is not possible, if two bits are missing from each byte. However, reconstructing the bytes may be done with very simple circuits, if the missing bits are again available. The above ratio is an example only. For most applications, taking out an even smaller ratio, such as 1:10 of the original user data is sufficient to prevent the reconstruction of the information content.

The readout of the data from the data carrier 14 is performed in a reverse order as compared with that shown in FIG. 3.

For the purposes of reading back the data from the data carrier 14, the apparatus 10 also comprises two channels, a CD readout channel and the holographic readout channel. During readout, the CD channel of the apparatus 10 comprises the CD head 29 and the error correcting circuit 62, the buffer 64 and the data combiner/decoder 56. The error correcting circuit 62 takes out the reading errors from the physical readout signal in a known manner, and restores the CD data stream (see also FIG. 3). The buffer 64 ensures that the the CD data stream arrives at the input of the data combiner/decoder 56 with appropriate timing in relation to the restored holographic data stream. This latter is read back from the holographic layer 16 of the data carrier 14 through the holographic readout channel of the apparatus 10. The holographic readout channel contains the holographic head 39, the error correcting circuit 52, the buffer 54 and also the data combiner/decoder 56. The proper control of these units is performed by the CPU 42 of the control means 40. During readout, the divided parts of the user data UD, i. e. the CD data parts CD and the holographic data parts HD are extracted from the CD readout channel and the holographic readout channel, and the extracted user data parts are reconstructed by the data combiner/decoder 56. Thereafter, the reconstructed user data UD are fed into the user data output 60. Thereby the original user data stream may be utilised at the user data output 60. In this process, the CD data are read from the CD layer 12 substantially simultaneously with the reading of the holographic data HD from the holographic layer 16. The user data is also reconstructed substantially continuously in real-time during readout. This means that the buffers 64 and 54 do not have to store significant amounts of data, and the readout system may be kept relatively simple.

Preferably, the control means 40 also comprises a D/A converter 58, which produces an analogue output signal from the reconstructed digital user data. This analogue signal is then fed to the user data output 60. If the control means 40 of the apparatus 10 is embodied in a single chip, the original digital data content of the user data units UD can not be restored. Only analogue signals are output from the chip. The restored digital data never leaves the chip, so it is very securely protected against reading and copying. Because of the unknown holographically stored digital parts, the complete digital data can be neither read, nor copied. The only way of unauthorized copying of the stored material is redigitising with quality loss. Digitally stored analog signals (e.g. music, video, cinema) can be effectively protected against illegal reading and copying this way.

It is noted that in FIGS. 1,2 and 9,10 the control means does not include the electronics of the holographic head 39, which presumes that the holographic head processes the analogue optical signal of the hologram, namely the intensity distribution detected by the holographic detector, such as the detector array 106 in FIGS. 6 and 8. In this case there would be a digital signal between the holographic head 39 and the control means 40, which could be eventually intercepted. However, it is also possible to integrate the control means 40 directly onto the detector array 106 of the common optical head, such as the head 100 shown in FIGS. 6 to 8. Extracting the digital information from an analogue signal, namely the light intensity distribution of the object beam 111, is not a straightforward task, but in practice needs specific optical signal processing know-how. This means that the data is protected by an additional level of "encoding". Therefore, if this signal processing algorithm is also integrated in the control means 40, realised in a single chip, no digital signal could be picked up, which carries any digital data stored on the holographic layer 16.

However, it is also possible to output the restored user data UD to the user data output 60 in a digital form. Also, the apparatus 10 of FIG. 2 may read more traditional optical media, such as compact disks or DVD-s as well, where the complete user data is recorded in the optical layer, and there is no holographic layer 16. For this purpose, the apparatus 10 may comprise a known CD/DVD decoder 66, which bypasses the buffer 64 and the data combiner/decoder 56. The CD/DVD decoder 66 feeds the user data stream from the CD channel directly to the DA converter 58, or to the user data output 60.

In FIGS. 1 and 2, the holographic head 39 and the CD head 29 are illustrated as separate units. However, in a preferred embodiment, these two heads may be integrated in a single optical unit. This means that the first and second storage medium, i. e. the CD layer 12 and the holographic layer 16 are read by a common optical head.

In fact, one of the main advantages of dividing the data between a CD or DVD-type layer of a disk and between a holographic layer is the possibility of using a single readout head with a simple construction, which may be manufactured economically, and therefore may be included in relatively low-cost end-user devices, such as known CD or DVD players. Such a combined head will be shown with reference to FIGS. 6 to 8. However, it is also possible to use a combined head for writing of the data.

FIGS. 4 and 5 illustrate an optical data carrier 14, which is particularly suitable for the storage of data according to the data division method described above. This data carrier 14 shown in FIG. 4 is essentially an optical disk, which comprises a CD-type or DVD-type CD layer 12. The CD layer 12 acts as a first optical storage medium which is accessible from the top surface 72 in the embodiment shown in FIG. 4. The CD layer 12 is in practice a thin aluminium layer, which comprises embossed pits. The CD layer is covered on one side with a protective lacquer layer 74, and on the other side with a transparent substrate 76 having a well-defined thickness. In this manner the CD layer 12 is adapted for optical recording with light having a first wavelength, e. g. 780 nm for traditional compact disks, or between 655 and 635 nm for DVD disks. Even shorter wavelengths, such as 405 nm is also contemplated, for so-called blue-ray type disks. The data carrier 14 also comprises a second, holographic storage medium, namely the holographic layer 16. The holographic layer 16 is also accessible from the surface 72, similarly as the CD layer 12, and it is adapted for optical recording with light having a second wavelength, e. g. 650 nm or 780 nm. The holographic layer 16 may be recorded with a wavelength distinctly different from the working wavelength of the CD-type layer 12. The importance of having two different wavelengths will be explained with reference to FIGS. 6-8. The holographic layer 16 is separated from the CD layer by a wavelength selective mirror layer 78. This wavelength selective mirror layer 78 is substantially transmissive on the working wavelength of the CD layer 12 and substantially reflective on the working wavelength of the holographic layer 16. The holographic layer 16 is covered towards the surface 12 with a protective layer 80, which is transparent on both working wavelengths.

The major part of the user data is stored on the digital layer, i.e. the CD-type layer 12. The holographic layer 16 has no particularly high data density, it only contains information that enables the reading of the digital user data on the CD-type layer 12. The coupling between holographic and CD-type layer can be realised in several embodiments.

In a preferred embodiment, the apparatus 10 is adapted for reading a data carrier 14, where the first and second storage layer are accessible from same side of the data carrier 14. This means that the CD head 29 and the holographic head 39 may be integrated into a single optical head 100, as shown in FIG. 4. A possible layout of the head 100 realised as a read-only head is shown in FIGS. 6 to 8.

This embodiment of the optical head 100 comprises a first optical path for readout of information from the first optical storage medium, i. e. the CD layer 12, and a second optical path for readout of information from the second holographic storage medium, i.e. the holographic layer 16. Both optical paths are shown in FIG. 6, while the light beams of the CD-path only are shown in FIG. 7, and the light beams of the hologram path only are shown in FIG. 8. As it is clear from the figures, the first and second optical path has a common optical axis A, at least where the optical axis A intersects the optical storage layers of the data carrier 14.

The optical head 100 comprises a number of optical elements which are common for both optical paths. Such common elements are the beam splitter 82, the collimator and Fourier objective 84, the λ/4 plate 86 and the focusing and Fourier objective 86. These common optical elements comprise optically refractive surfaces, which are intersected by that optical axis A of the optical head 100, which is common for both optical paths. One way of separating the two optical paths from each other is realised by spatial division within the common optical elements. This means that parts of the optical surfaces in the direct vicinity, of the optical axis A form a part of the second optical path, i. e. the holographic path, while those parts of the optical surfaces in a radial distance from the optical axis A form a part of the first optical path, i. e. the CD path. For example, the collimator and Fourier objective 84 and the focusing and Fourier objective 86 may be manufactured as an aspheric lens, where a relatively small central region is designed for the imaging of the holographic path onto the holographic layer 16, while the outer parts of the lenses are designed for the imaging of the CD-path onto the CD-layer 12.

Thus the CD-path of the optical head 100 starts from the CD laser diode 90, which functions as a first light source having a first wavelength, such as 780 nm for a CD-type layer 12. The holographic path of the optical head 100 comprises a second light source, namely a second laser diode 96, which operates on a second, distinctly different wavelength, e.g. 655 nm. The optical elements of the first optical path, i. e. the CD path are designed for light on the first wavelength, and the second optical path, i. e. the holographic path is designed for light on the second wavelength. This means that the refractive surfaces and the antireflective layers of the optical elements are calculated for their respective wavelengths.

However, spatial separation along the optical surfaces is supplemented by wavelength separation. This means that light propagating along one of the optical path is separated from light propagating along the other optical path with wavelength selective layers. One of these wavelength selective layers is the wavelength selective mirror 78 on the data carrier 14. The other wavelength selective layer is another wavelength selective mirror 98 on the beamsplitter 82.

The CD optical path, which starts from the laser diode 90, goes through the beam splitter 82, the collimator and Fourier objective 84, and it is focussed onto the CD-layer 12 through the focusing and Fourier objective 88. The light reflected from the CD layer 12 propagates back through the same objectives 88 and 84, and it is reflected towards the CD detector 94 by the beam splitter 82, because the wavelength selective mirror 98 is transmissive on the wavelength of the first laser diode 90. The light falls onto the CD detector 94 through a cylindrical lens 92 in a known manner, providing focus and tracking information. The λ/4 plates 99 and 86 do not affect the propagation of the light in the CD path.

As best seen in FIG. 8, the holographic optical path starts from the second laser diode 96, which forms a polarised reference beam 101, with appropriate beam forming optics (not shown). The reference beam propagates through a special beam splitter 102, which is provided with a beam splitting layer 103 having a central aperture 104. The beam splitter layer 103 is transmissive for the reference beam 101 in the central aperture 104. Thereafter, the reference beam 101 propagates through the Fourier objective 105 and the beam splitter 82. Thereafter the reference beam 101 is reflected from the wavelength selective mirror 98, while it goes twice through the λ/4 plate 99, which rotates the polarisation state of the reference beam 101, which is now reflected by the bean splitter 82 towards the holographic layer 16. The reference beam is then imaged onto the holographic layer 16 through the collimator lens and Fourier objective 84 and focusing and Fourier objective 88, also going through the other λ/4 plate 86. An image plane 108 and a Fourier plane 110 of the holographic path is also indicated.

The reference beam 101 is diffracted on the holographic layer 16, generating the reflected object beam 111. The object beam 111 is reflected back towards the beam splitter 102 on the same path as the reference beam 101. Again, similarly as the reference beam 101, the object beam 111 is reflected from the wavelength selective mirror 98, which is reflective on the wavelength of the laser diode 96. The use of the λ/4 plates 86 and 99 ensures that the object beam 111 will have a correct polarisation for appropriate reflection and transmission through the beam splitter 82.

As the object beam 111 falls onto the beam splitter layer 103 of the beam splitter 102, due to the diffraction on the holographic layer 16, it will fall outside the central aperture 104, and therefore it will be reflected towards the holographic detector array 106. The holographic detector array 106 detects the data intensity distribution of the object beam 111, and thereby the data stored in the holographic layer, i. e. the holographic data stream of FIG. 3 is retrieved in a known manner. The data extracted from the signals of the CD detector 94 and the holographic detector array 106 are then combined into the user data as explained above.

The security of the system may be enhanced by the use of an identifier as an additional input code. The input code may have several forms. This code may be carried by a key-word, e. g. in the case of multiple users, who are entitled to access a common database. Optionally, the input code may be carried by the user as a biometrics feature. This limits the use of the data to a single user, but it is highly secure. Finally, the input code may be carried by some optical or electronic hardware. Preferably, this identifier is combined with phase coding of the data in the holographic channel, as explained below.

Holographic recording of a part of the user data allows for a further degree of copy protection, if the data recorded in the holographic layer 16 are phase coded. Phase coding of data recorded in a hologram is described, among others, in the document WO02/05270 A1. In a known manner, phase coded holograms may only be retrieved correctly if the readout is performed with the same phase code as the recording. For this purpose, it is foreseen to include in the apparatus 100 means for generating a phase code in the reference beam. These means are typically embodied by a phase array SLM 120, which is shown schematically in the holographic head 39 of FIGS. 1 and 2. The phase array SLM 120 may be controlled by the CPU 42, or also directly by an ID input interface 46.

The ID input interface 46 functions as means for inputting an identifier to the control means 40. In this case the control means 40 will also comprise means for assigning a phase code to the identifier, for example the CPU 42 or the ID input interface 46 itself may contain an algorithm which generates a unique phase code from any identifier. The identifier may be associated to digital rights management data pertaining to the user data. In this manner, access to the user data stored in the data carrier may be controlled by distribution of the identifier, and only those apparatuses 10 will be able to retrieve the holographic data HD from the data carrier 14, which receive the identifier. In this manner not only the holographic data HD, but also the CD data stream will be useless for unauthorised persons.

As a result, a large amount of data, such as a complete CD or DVD is fully protected from unauthorised readout, with practically the same level of security and in the same manner as if all the user data were recorded in the phase-coded hologram. However, only a modest holographic recording capacity is necessary, being only a fraction of the total data storage capacity of the system. Therefore, the holographic channel and the holographic layer 16 need not be very sophisticated, and may be realised cheaply. At the same time, only a minimal processing capacity is required from the readout apparatus. Therefore, the proposed system offers low-cost, but effective protection to relatively large amounts of data.

In the above examples, the hologram on the data carrier 14 was recorded by the apparatus 10. However, the apparatus 10 would be also capable of reading a hologram which is manufactured permanently on the disk, e. g. it is stamped into the upper layer of the data carrier 14. Such a hologram may be manufactured in a simple and cheap manner. This method lends itself to applications where the data need not be altered at all, as with audio and video disks.

Turning again to FIGS. 1 and 2, readout of data which was phase coded during the holographic recording with the phase array SLM 120 necessitates the input of the correct identifier at the input 122 of the ID input interface 46. The input of an identifier may also be performed by the control means 40, in case the identifier itself is stored also on the CD layer 12 or the holographic layer 16. Therefore, the apparatus 10 may comprise means for retrieving the identifier through one of the reading channels from one or both of the extracted user data parts. However, this scheme is inherently more insecure, because the identifier may be more easily found by hackers. However, it will still require the use of a reading apparatus which is equipped with phase coding means, such as the phase array SLM 120. Readout of the data with simpler readout heads, such as the optical head described with reference to FIGS. 6 to 8, will not be possible.

However, for more secure applications it is suggested that at least a part of the user data is encrypted with an algorithm having at least one encryption key. Preferably, that part of the user data is encrypted, which is recorded in the CD layer 12. The encrypted part of the user data and the associated encryption key is recorded in different data sets, which means that the encryption keys are recorded in the holographic layer 16. It is also feasible to divide the user data into data blocks, so that each data block is encrypted with a different encryption key. However, this requires significant processing capabilities in the control means 40, particularly if the data should be retrieved and decrypted substantially continuously. The large number of encryption keys may be stored in the other recording medium, together with the smaller part of the user data. For this purpose, it is suggested to include in the control means 40 means for executing a decryption algorithm, where the decryption algorithm is capable of reconstructing the user data from encrypted data stored in the first data set, e. g. in the CD layer 12. In this case the control means 40 may also contain means for retrieving the encryption keys, which are stored in the second data set, e. g. in the holographic layer 16. FIGS. 9 and 10 illustrate such embodiments of the apparatus 10, for the recording and readout of data. The apparatus shown in FIGS. 9 and 10 contain all functional elements which were explained with reference to FIGS. 1 and 2, so these not need be described once more. As additional functional elements, the recording apparatus 10 shown in FIG. 9 is equipped with the an encryption key generator 130, which may generate random encryption keys, or deterministic ones based on an identifier input through the ID input interface 46. The keys generated by the encryption key generator 130 are used by the encryptor unit 132 to code the data stored in the holographic channel. The encryption keys are mixed into the CD data stream by the key adder circuit 134.

The readout apparatus of FIG. 10 contains a key retriever circuit 136, which extracts the encryption keys from the CD data stream arriving from the error correcting circuit 62. The extracted encryption keys are fed through an additional buffer 138 with correct timing to the decryptor circuit 140, which performs the decryption of the data in the holographic data stream. Thereafter, the CD data stream and the holographic data stream are combined in the data combiner/decoder 56, as explained above with reference to FIG. 2.

The data in the second data set or also in the first data set eventually may be combined with further software encryption, or coding of the data for other purposes. For example, to ensure a relatively even illumination of the holograms, a known RLL (run length limited) code may be applied in the data sets.

A possible application area of the invention is the distribution of expensive software (e.g. CADs). Parts of the installation software may be stored in several encrypted holograms, each with a different key. A setup program is stored in some holograms without encryption. The encryption keys of the other holograms are compiled into this setup program. Only this setup program can read the data from the encrypted holograms and can execute the install process. The holographic encryption prevents both the reading and copying of the installed medium, which makes the unlicensed distribution of the software very difficult. Finding all the encryption keys by debugging the setup program is very complicated simply because of the large number of keys. This method can effectively protect other types of valuable computer data, as e.g. digital books, maps, pictures . . . etc.

The invention claimed is:

1. A method of recording user information on a storage medium for preventing unauthorized readout of the user information comprising:
   converting the user information into digital data;
   dividing the digital data into first and second data sets for recording on, respectively, optical and holographic storage layers of a storage medium, wherein a part of the user information is contained only in the first data set and another, remaining part of the user information is contained only in the second data set, wherein a ratio of the part to the remaining part is between a ratio of data capacities and a ratio of data reading speeds of the optical and holographic storage layers, and wherein information contained in any one of the first and second data sets is insufficient by itself to restore completely the user information contained in both the first and second data sets;
   recording the first data set on the optical storage layer of the storage medium; and
   recording the second data set on the holographic storage layer of the storage medium.

2. The method according to claim 1, in which the user information is at least one of digital audio and video information.

3. The method according to claim 2, in which the second data set recorded in the holographic storage layer is phase coded.

4. The method according to claim 3, in which the phase code is assigned to an identifier.

5. The method according to claim 4, in which the identifier is associated to digital rights management data pertaining to the user information.

6. The method according to claim 5, in which the recording on the optical storage layer is made with CD or DVD format.

7. The method according to claim 1, in which at least a part of the user information is encrypted with an algorithm having at least one encryption key, and the encrypted part of the user information and the associated encryption key are recorded in different ones of the first and second data sets.

8. The method according to claim 7, in which the user information is divided into data blocks, each data block being encrypted with a different encryption key.

9. The method according to claim 1, in which the digital data is divided into data blocks, and wherein a part of each of the data blocks is contained only in the first data set, and the complementing part of each of the data blocks is contained only in the second data set.

10. The method according to claim 9, in which, the parts and the complementing parts of the data blocks are recorded in the storage medium in a manner which facilitates the substantially simultaneous readout of the parts and the associated complementing parts of the data blocks.

11. The method according to claim 1, in which the division of the digital data between the second and first data sets is made in a proportion not less than 1:10, respectively.

12. The method according to claim 11, wherein the proportion is not less than 1:4.

13. The method of claim 1, further comprising the steps of
reading the first data set from the first storage layer, and substantially simultaneously reading the second data set from the holographic storage layer, and
reconstructing substantially continuously in real-time the user information during readout.

14. An apparatus for at least one of recording data to, and reading data from, a storage medium comprising:
at least one of:
(i) a first optical recording channel and a second recording channel for recording data, respectively, to an optical storage layer and a holographic storage layer on a first storage medium, and
(ii) a first optical reading channel and a second reading channel for reading data, respectively, from an optical storage layer and a holographic storage layer on a second storage medium; and
control means for controlling the operation of at least one of (i) the first optical recording channel and second recording channel, and (ii) the first optical reading channel and the second reading channel, wherein the controlling includes at least one of steps a) and b):
wherein the step a) comprises:
dividing first digital data representative of first user information into first and second data sets, wherein a part of the first user information is contained only in the first data set and another, remaining part of the first user information is contained only in the second data set, wherein a ratio of the part to the remaining part is between a ratio of data capacities and a ratio of data reading speeds of the optical and holographic storage layers, and wherein information contained in any one of the first and second data sets is insufficient by itself to restore completely the first user information contained in both the first and second data sets; and
controlling the first and the second recording channels for recording the first and second data sets, respectively, onto the optical and holographical storage layers of the first storage medium; and
wherein the step b) comprises:
reconstructing second user information from the second storage medium, wherein the reconstructing includes extracting third and fourth data sets of second digital data representative of the second user information stored, respectively, on the optical and holographical storage layers of the second storage medium using the first and second readers, wherein a first part of the second user information is contained only in the third data set and another, second remaining part of the second user information is contained only in the fourth data set, wherein a ratio of the first part to the second remaining part is between a ratio of data capacities and a ratio of data reading speeds of the optical and holographic storage layers of the second medium, and wherein information contained in any one of the third and fourth data sets is insufficient by itself to restore completely the second user information contained in both the third and fourth data sets; reconstructing the second user information from the extracted data sets; and feeding the reconstructed second user information to a data output.

15. The apparatus according to claim 14, in which the control means comprises a microprocessor with an associated memory, and the memory comprises a software instructing the control means to perform at least one of the steps a) and b).

16. The apparatus according to claim 14, in which the control means comprises a dedicated chip, in which at least one of the steos a) and b) is hardware coded.

17. The apparatus according to claim 14, in which the control means comprises means for executing a decryption algorithm for reconstructing the second user information from encrypted data stored in the third data set and encryption keys stored in the fourth data set on the second storage medium.

18. The apparatus according to claim 14, in which the control means comprises a D/A converter for producing an analogue output signal from the reconstructed second user information.

19. The apparatus according to claim 14, wherein the first and second readers are adapted for reading the optical and holographic storage layers, respectively, from the same side of the second storage medium, wherein the second storage medium is a data carrier.

20. The apparatus according to claim 19, in which the first and second readers and recorders contain a common optical head.

21. The apparatus according to claim 20, in which the optical head comprises a first optical path for readout of the optical storage layer, and a second optical path for readout of the holographic storage layer, of the second storage medium.

22. The apparatus according to claim 21, in which the first and second optical paths have a common optical axis, at least where the optical axis intersects the optical storage layer of the second storage medium.

23. The apparatus according to claim 21, in which the optical head comprises optical elements, the optical elements comprising optically refractive surfaces intersected by an optical axis of the optical head, wherein parts of the optical surfaces in the direct vicinity of the optical axis form a part of the first optical path, while parts of the optical surfaces at a radial distance from the optical axis form a part of the second optical path.

24. The apparatus according to claim 21, comprising a first light source having a first wavelength and a second light source having a second wavelength, and the first optical path being adapted for light having a first wavelength, and the second optical path being adapted for light having a second wavelength.

25. The apparatus according to claim 24, in which light propagating along one of the optical paths is separated from light propagating along the other optical path with a wavelength selective layer.

26. The apparatus according to claim 14, comprising means for generating a reference beam in at least one of the second reading and recording channels, and further comprising means for generating a phase code in the reference beam.

27. The apparatus according to claim 26, comprising means for inputting an identifier to the control means, and the control means comprising means for assigning a phase code to the identifier.

28. The apparatus according to claim 27, comprising means for retrieving the identifier through one of the first and second reading channels from at least one of the extracted data sets.

29. A data carrier comprising:

an optical storage layer accessible from a first surface of the carrier and adapted for optical recording with light having a first wavelength;

a holographic storage layer accessible from the first surface of the carrier and adapted for holographic recording with light having a second wavelength; and a wavelength selective mirror layer disposed between the optical storage layer and the holographic storage layer, wherein the wavelength selective mirror layer is substantially transmissive at the first wavelength and substantially reflective at the second wavelength;

wherein the data carrier includes digital data representative of user information, wherein the digital data includes first and second data sets, wherein a part of the user information is contained only in the first data set stored in the optical storage layer and another, remaining pad of the user information is contained only in the second data set stored in the holographic storage layer, wherein a part of the first user information is contained only in the first data set and another, remaining pad of the first user information is contained only in the second data set, wherein a ratio of the part to the remaining pad is between a ratio of data capacities and a ratio of data reading speeds of the optical and holographic storage layers, and wherein information contained in any one of the first and second data sets is insufficient by itself to restore completely the user information contained in both the first and second data sets.

* * * * *